RADIO VISION SYSTEM WITH HIGH-SPEED SCANNER FOR SHORT RADIO WAVES

Filed April 18, 1944 2 Sheets-Sheet 1

INVENTORS
HARLEY IAMS
& HENRY B. DEVORE
BY C. D. Tuska
ATTORNEY

RADIO VISION SYSTEM WITH HIGH-SPEED SCANNER FOR SHORT RADIO WAVES

INVENTORS
HARLEY IAMS
& HENRY B. DEVORE
BY C. D. Tuska
ATTORNEY

Patented Oct. 3, 1950 2,524,292

UNITED STATES PATENT OFFICE 2,524,292

RADIO VISION SYSTEM WITH HIGH-SPEED SCANNER FOR SHORT RADIO WAVES

Harley Iams, Princeton, and Henry B. De Vore, Cranbury, N. J., assignors to Radio Corporation of America, a corporation of Delaware Application April 18, 1944, Serial No. 531,628

13 Claims. (Cl. 343—16)

The subject invention is related to improvements in radio vision devices and especially to a radio vision device in which successive regions of a scene are scanned by pulsed radio frequency energy which, after reflection, is converted into visible signals, or the scene may be flooded by radio frequency waves which, after reflection, are imaged and scanned and made visible by suitable means, or scanning may be used in both transmission and reception. As used herein the term image applies to visible and invisible waves which are focused simultaneously as a whole or in associated elementary areas which are focused one after another and suitably disposed in space as by scanning. As used herein the term scanning means the process of directing sharply defined beams of radiant energy to successive positions throughout a region or area; by way of example, the scanning beam may be directed along juxtaposed regions which may be defined in terms of horizontal and vertical coordinates.

It is known that when radio frequency waves are directed toward a scene which is to be viewed, the objects in the scene reflect the radio waves, and these may be detected and converted into electrical currents. The electrical currents can be converted into visible manifestations whereby the scene is reproduced. Devices of this type have employed scanning means in both the transmitter and receiver.

In the present invention, improved means are used for scanning the scene to be reproduced and in scanning the radio frequency images which are formed by the reflected waves. According to one form of the invention, an image is formed and thereafter scanned whereby one coordinate of the scene to be viewed is established. Thereafter, another image of a region displaced from the first is formed which is in turn scanned. This method of scanning is continued until the entire scene has been scanned. By employing pulses of radio energy, the same scanning means may be used alternately for transmitting and receiving.

One of the objects of the invention is to provide an improved scanning means for a radio vision device. Another object is to provide improved means for forming a substantially plane image of radio waves. An additional object is to provide an improved device for converting the radio energy in a region having substantially rectangular boundary lines into a radio image having curvilinear boundaries. A further object is to provide a novel radio frequency focusing element which is composed of both refracting and conductive materials.

Figures 1, 6, 7, 8:
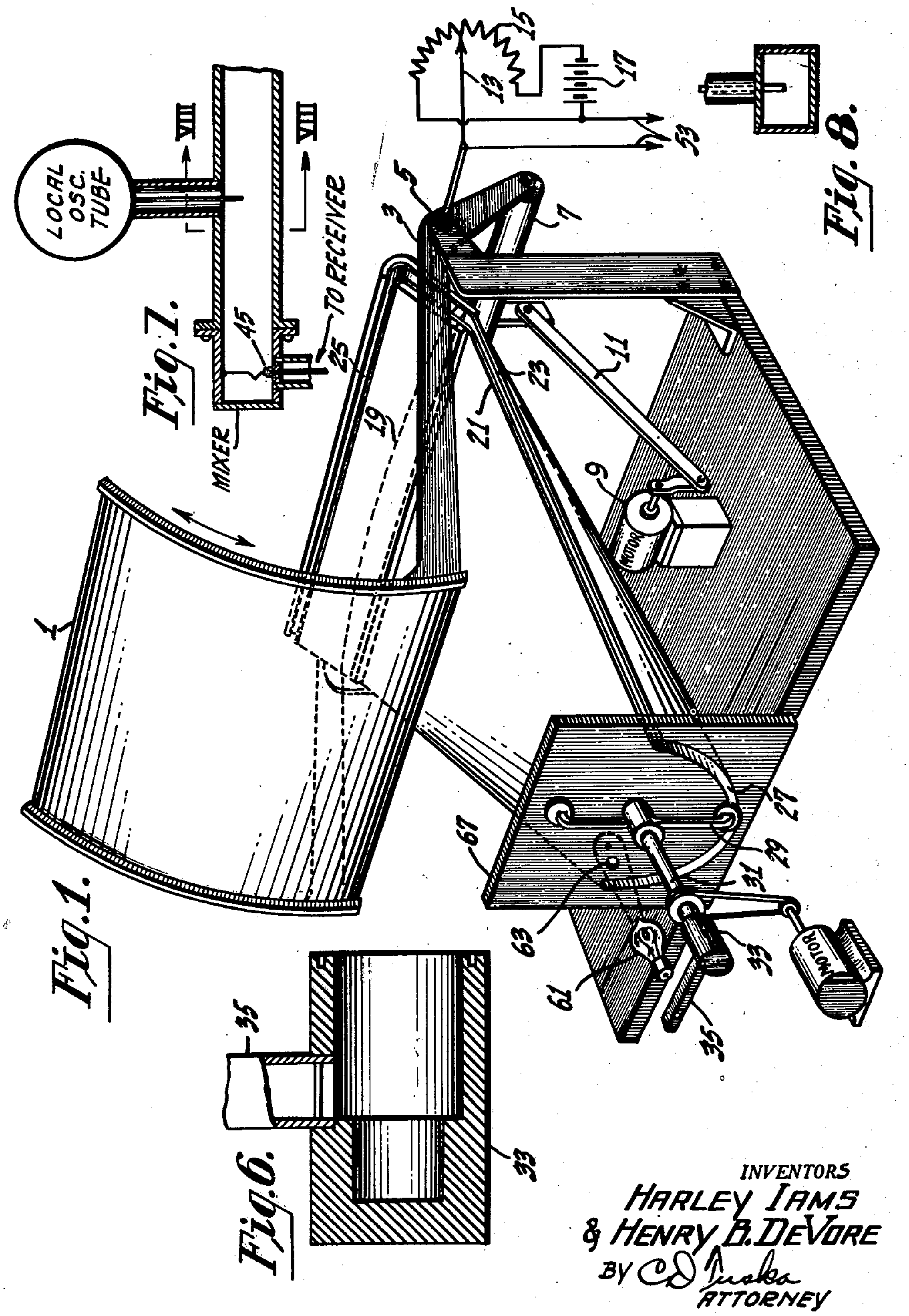
Figures 2, 3, 4, 5:
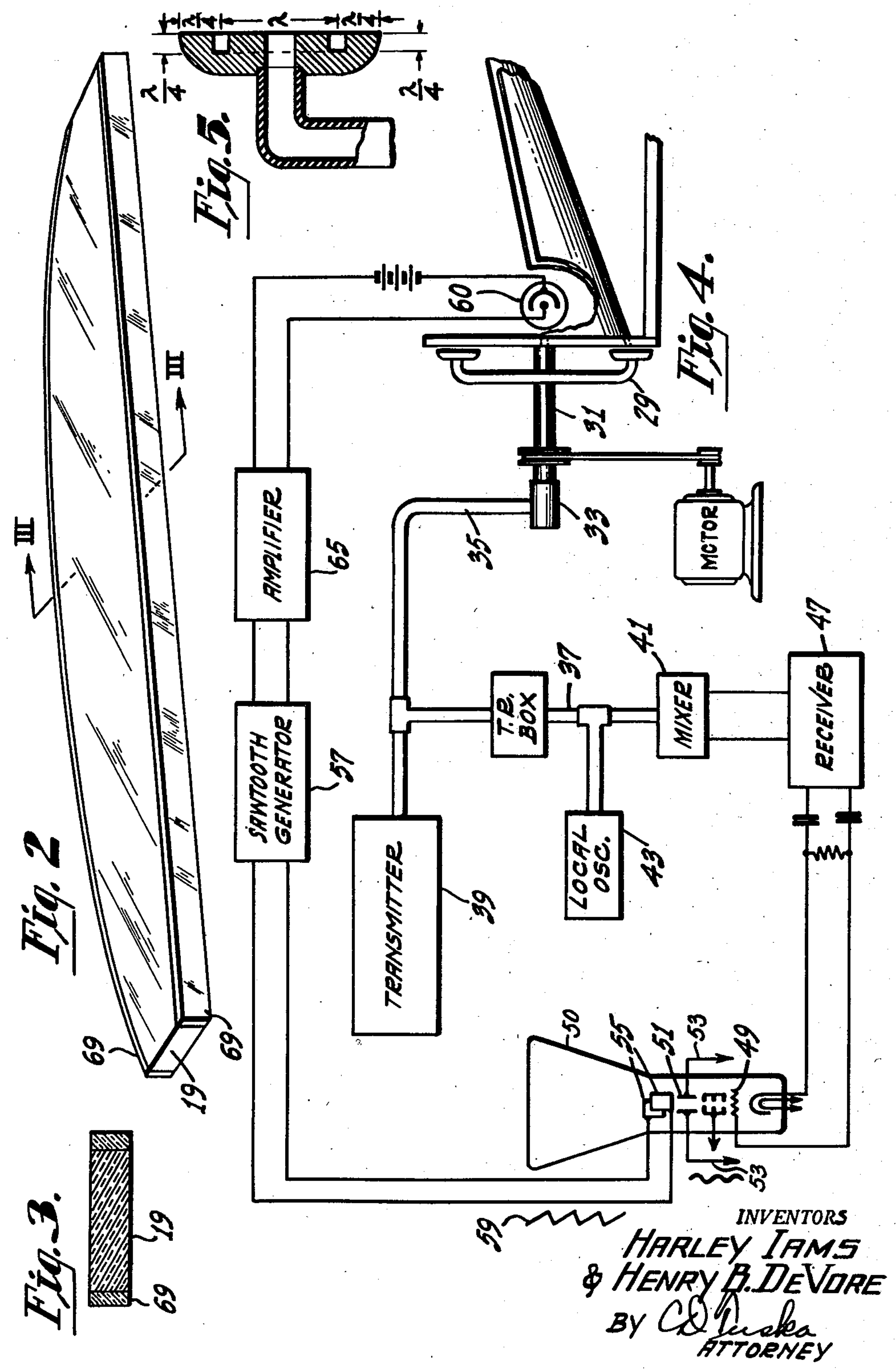

The invention will be described by referring to the accompanying drawings in which Figure 1 is a perspective view of one embodiment of the radio frequency scanning means of the invention; Figure 2 is a perspective view of the radio frequency lens which is used in the invention; Figure 3 is a sectional view of the lens of Figure 2 taken along the line III—III; Figure 4 is a schematic diagram of the circuits of the invention; Figure 5 is a detailed sectional view of a radio frequency choke employed in the invention; Figure 6 is a detailed sectional view of a wave converting means employed in the scanning mechanism; Figure 7 is a detailed sectional view of the radio wave converting means employed in the receiving circuits; and Figure 8 is a sectional view taken along the line VIII—VIII of Figure 7.

Referring to Figure 1, a concave cylindrical radio frequency wave reflector 1 is mounted on an arm 3 which is pivoted on a bearing 5. The reflector is preferably counterbalanced by a weight 7. The reflector is oscillated about its pivotal mounts by means of a motor 9 and crank rod assembly 11. The reflector mechanism is preferably connected to the movable arm 13 of a potentiometer 15. The potentiometer is connected to a battery 17. The potentiometer arrangement provides deflecting potentials, to which reference will be hereinafter made.

A radio frequency lens 19 consisting of a wave refracting material, such as Mycalex, is inserted between a pair of parallel conducting sheets 21, 23 preferably spaced the order of $\lambda/2$, or less, apart. One edge of the parallel conductors including the lens 19 is mounted near the focal line of the reflector 1. The two conductive members 21 and 23 are curved to form a directive aperture 25 so that the radio waves from the reflector 1 are applied to the lens 19. The conductive members 21, 23 are curved to form an annular aperture 27 which substantially covers 180°. A pair of hollow scanning arms 29 are mounted on a rotatable circular wave guide 31. Both of the arms are preferably provided with radio frequency chokes in the form of suitably disposed slots which are more completely illustrated in Figure 5. The open ends of the rotating arms 29 are disposed opposite the annular opening 27 so that the radio frequency waves from the annular opening are conducted through the wave guides to a wave converting member 33.

The function of the wave converting member 33 is to convert the $E_0$ waves, which travel the circular guide, into waves which have their electric vectors parallel to the narrow sides of the rectangular wave guides 35, 37, which are used to convey the transmitted wave energy from the pulse transmitter 39 to the reflector 1 and also to convey the received wave energy from the reflector 1 to a mixer 41. It should be understood that the wave converting member 33 is stationary and suitably coupled to the rotatable wave guide 31. A TR box is interposed between the pulse transmitter 39 and the mixer 41 to substantially short-circuit the path leading to the mixer when energy is being radiated whereby the energy is greatly attenuated in the receiver path. In a similar manner the TR box provides an open path with respect to the received energy whereby most of the received energy is applied to the receiver, because the path to the transmitter appears closed to the received waves.

The radio receiver preferably includes a local oscillator 43. The radiated energy from the local oscillator is applied to the wave guide 37 and hence is applied along with the received waves to the crystal detector 45 which is disposed in the mixer 41. The arrangement of the local oscillator and the mixer is illustrated in Figure 7. The output from the mixer 41 is applied to an intermediate frequency receiver 47 which includes amplifying and detecting means. The output from the receiver is applied to the control electrode 49 of a cathode ray tube 50.

One pair of the deflecting elements 51 of the cathode ray tube is connected to the leads 53 of the potentiometer 15. The applied potentials, which may be of any desired wave form, deflect the ray along a vertical coordinate. The other pair of deflecting elements 55 of the cathode ray tube is connected to a generator 57. The generator applies deflecting potentials having saw-tooth wave form 59 to deflect the ray along a horizontal coordinate. The generator 57 is synchronized in any suitable manner with the movement of the rotating arms 29.

One suitable synchronizing means consists of a photo-electric cell 60 which is made responsive to light from a suitable source 61 which is applied through an aperture 63 to the photo-electric tube 60. As the rotating arms 29 pass across the aperture, the light to the photo cell is interrupted. This establishes a potential which may be applied directly to the saw-tooth generator or through the amplifier 65. Thus, the saw-tooth generator is synchronized.

The operation of the radio vision device is essentially as follows: The pulse transmitter generates sharply defined radio pulses. In one device these pulses consisted of radio waves of a frequency of 24,000 megacycles, each pulse consisting of a wave train having a duration of 1/4 microsecond and a pulse or train repetition rate of 2,000 per second. The pulses of energy are applied through the rectangular wave guide 35 to the wave converting device 33 and hence to the circular wave guide 31 and to the rotating arms 29. One of the arms is effectively terminated in a short circuit when the arm, including the radio frequency choke member of Figure 5, is disposed close to the conductive member 67 which includes the annular aperture 27. The other arm, being disposed with its opening near the annular aperture 27, applies the pulses of radio frequency energy through the aperture to the region bounded by the conductive elements 21, 23 which terminate in the radio frequency lens 19. Thus, the pulses are applied at successive points along the focal line of the lens, are focused by the lens to form a beam of radiation having small angular divergence in the plane of the lens, then directed through the aperture 25 to the reflector 1. The reflector directs the energy along a sharply defined path to the scene to be scanned; thereafter, the reflector 1 is moved so that the next radio frequency pulse is applied to the next area (which may include a portion of the first area) of the scene to be scanned. The cycles continue until the entire scene is scanned laterally and vertically by a series of radio frequency pulses. By way of example in one device the vertical and horizontal scanning rates were two frames per second and sixty lines per second, respectively.

As the pulses are applied by the rotating arm 29 to successive elementary areas of the annular opening 27, the cathode ray beam is moved synchronously along the horizontal coordinate by the deflecting voltages which are applied to the deflecting electrodes 55. As the scanning proceeds vertically, the potentials applied to the leads 53 vary so that the cathode ray beam of the cathode ray tube 50 is moved along the vertical coordinate in synchronism with the radio frequency scanning. Thus, as the transmitted waves are successively applied to scan the scene, the cathode ray beam is made to scan synchronously the fluorescent screen (not shown) on the viewing end of the cathode ray tube 49. A cathode ray tube having a long persistence screen may be used when the scanning rate is less than the persistence of vision.

Since each transmitted pulse is of relatively short duration and suitably spaced from the next succeeding pulse, the radiated radio frequency energy is given sufficient time to travel from the reflector to an object within the scene and then after reflection from the object back to the reflector 1 and hence to the receiver 47. The received reflected energy is then applied to the cathode ray control electrode whereby the cathode ray is modulated to indicate the reflected signal. In this manner, the radio frequency energy, after reflection, is converted into electrical currents which are in turn converted into visible images.

In order that the device may have the maximum sensitivity, it has been found desirable to minimize the reflection of the radio energy from the surfaces of the radio lens 19. One suitable means for reducing the reflection from the effective surfaces of the lens is to apply thereto a coating 69 which has an effective thickness equal to an odd number of quarter wave lengths of the applied energy, the wave length in this instance being measured in the coating material. The coating should also have a dielectric constant which is approximately the square root of the dielectric constant of the lens material. In the case of Mycalex lenses for which the dielectric constant is abbout 6.1, it has been found that the coating may consist of a strip of "Lucite" or polystyrene, having a dielectric constant of 2.5, which is about 0.075'' thick for a frequency of 24,000 megacycles. It should be understood that the wave reflections from the lens may also be minimized by tapering the surfaces whereby the change from the medium through which the waves are transmitted to the material of the lens may be made gradual. The lens is described and claimed in application Serial No. 532,381, filed April 22, 1944 by Harley Iams, now Patent No. 2,415,352, issued February 4, 1947, for Improved Lens for Radio Frequency Waves.

Thus, the invention has been described as an improved radio vision device. The transmitter consists of a source of pulse energy which is applied through the scanning mechanism to the scene to be viewed. The reflected energy is likewise applied through the scanning mechanism to a radio receiver and thence to a cathode ray tube where an image of the scene is formed. Suitable synchronizing means are provided so that the viewing device is synchronized with the radio frequency of the scene.

We claim as our invention:

1. A radio vision device including a source of discrete pulses of radio frequency energy, scanning means for directing said pulses of energy along successive portions of a curvilinear path, means for changing the energy from said curvilinear path to a plane path, means for focusing the energy in said plane path whereby radio waves may be directed toward a scene to be viewed and applied to an elementary region thereof, and additional scanning means for successively changing the direction of said waves whereby the waves are applied to the entire area of the scene to be viewed.

2. A radio vision device including a source of radio frequency energy, a pair of parallel conducting sheets, a movable wave guide for applying said energy at successively varying positions in the space between said parallel conducting sheets, means between said sheets for focusing said energy, and additional means for focusing said energy emerging from said parallel sheets in a direction transverse to the plane of said sheets and for successively changing the direction of said focused energy in a plane transverse to the plane of said sheets.

3. A radio vision device including a source of radio frequency wave energy, a pair of parallel conducting sheets, movable means for applying said energy at successively varying positions in the space between said parallel conducting sheets, means between said sheets for focusing said energy, and additional focusing and scanning means for focusing said energy emerging from said parallel sheets in a direction transverse to the plane of said sheets and for successively changing the direction of said focused energy in a plane transverse to the plane of said sheets.

4. The invention according to claim 3 wherein amplifying and detecting means are effectively connected to said movable means for converting said wave energy after reflection from said scene into electric currents, and wherein means are provided for converting said electric currents into a visible image corresponding to the radio waves from said scene.

5. A radio vision device including a cylindrical reflector and a cylindrical converging lens having their axes transverse to each other for focusing to a point the radio waves received from a point in a scene to be viewed, means for directing said radio waves during focusing such that said focal point lies at some position along a curved line, means for scanning along said curved line whereby the scene is scanned along one coordinate, means for changing the position of said reflector whereby the scene is scanned along a second coordinate, amplifying and detecting means effectively connected to said scanning means for converting said waves into electric currents and means including a cathode ray tube for converting said electric currents into a visible image corresponding to the radio waves from said scene.

6. A radio vision device including means for directing discrete pulses of radio waves toward objects in a scene to be viewed, a cylindrical reflector and a cylindrical converging lens having their axes transverse to each other for focusing to a point said radio waves after reflection from objects in said scene, means for directing said radio waves during focusing such that said focal point lies at some position along a curved line, means for scanning along said curved line whereby the scene is scanned along one coordinate, means for moving said reflector whereby the scene is scanned along a second coordinate, amplifying and detecting means effectively connected to said scanning means for converting said reflected waves into electric currents, and means for converting said electric currents into a visible image corresponding to the radio waves from said scene.

7. A radio vision device including a cylindrical reflector and a cylindrical converging lens having their axes transverse to each other for focusing to a point radio waves from a point in a scene to be viewed, means for directing said focused radio waves to a point along a curved line, means for scanning said curved line, means for scanning with said cylindrical reflector, amplifying and detecting means effectively connected to said first scanning means for converting said waves into electric currents, a cathode ray tube having horizontal and vertical deflecting elements and a control electrode, means for applying deflecting potentials to said elements so as to cause the cathode ray of said tube to be deflected in synchronism with both of said scannings, and means for applying said electric currents to said control electrode whereby said currents are converted into a visible image corresponding to the radio waves from said scene.

8. A radio vision device including means for directing radio waves toward objects in a scene to be viewed, means for converging the radiation received from a part of said scene into a single line focus, means for varying the part of the scene focused into said line focus, means for scanning along said line focus whereby the scene is scanned along two coordinates, amplifying and detecting means effectively connected to said scanning means for converting said reflected waves into electric currents, means for amplifying said electric currents, and means for converting said amplified electric currents into a visible image corresponding to the radio waves from said scene.

9. A radio vision device including means for directing pulses of radio waves toward objects in a scene to be viewed, means for collecting said waves after reflection from objects in a portion of said scene, means for directing the energy received from each object to a corresponding point on a curved focal line, means for scanning said curved focal line, means for continuously varying the portion of the scene represented on said curved focal line whereby the scene is scanned in two coordinates, amplifying and detecting means effectively connected to said scanning means for converting said reflected waves into electric currents, and means for converting said electric currents into a visible image corresponding to the radio waves from said scene.

10. A radio vision device including means for collecting a succession of pulses of radio frequency energy received from different elemental areas of a scene to be viewed, a pair of spaced conducting sheets that are curved to define a curved slot along one boundary, means for focusing said energy received from each of said elemental areas to a position along said curved slot representing its position in said scene, means for varying the portion of the scene from which energy is focused along said slot, means for collecting energy from successive points along said slot, amplifying and detecting means effectively connected to said energy collecting means for converting said energy into electric currents and means for converting said electric currents into a visible image corresponding to the radio waves from said scene.

11. A radio vision device including a source of pulses of radio frequency energy, a pair of spaced conductive sheets, a wave guide movable with respect to said pair of conductive sheets for directing said pulses into a predetermined region, a cylindrical converging lens and a cylindrical reflector having their axes transverse to each other for focusing the pulses of energy from said region whereby radio waves may be directed toward a scene to be viewed and applied to an elementary region thereof, and additional means for successively changing the angular direction of said radio waves in a plane transverse to said sheets whereby the waves are caused to scan the entire area of the scene to be viewed.

12. A radio vision device comprising in combination parallel conducting sheets, a cylindrical converging lens having its axis transverse to said sheets for focusing radio frequency energy between said parallel conducting sheets, and a means for scanning the focal region of said lens.

13. A device for scanning with radio waves comprising spaced parallel metal sheets, a cylindrical converging lens placed between said sheets with its axis transverse to said sheets and a moving wave guide for applying radio frequency energy at varying points along a slot formed by the edges of said sheets said points lying along the focal curve or region of said lens.

HARLEY IAMS.
HENRY B. DE VORE.

REFERENCES CITED

The following references are of record in the file of this patent:

UNITED STATES PATENTS

| Number | Name | Date |
|---|---|---|
| 1,699,270 | Baird | Jan. 15, 1929 |
| 2,083,292 | Cawley | June 8, 1937 |
| 2,142,648 | Linder | Jan. 3, 1939 |
| 2,151,549 | Becker | Mar. 21, 1939 |
| 2,155,471 | Cawley | Apr. 25, 1939 |
| 2,206,923 | Southworth | July 9, 1940 |
| 2,231,929 | Lyman | Feb. 18, 1941 |
| 2,257,320 | Williams | Sept. 30, 1941 |
| 2,273,447 | Ohl | Feb. 17, 1942 |
| 2,415,352 | Iams | Feb. 4, 1947 |
| 2,419,024 | Iams | Apr. 15, 1947 |
| 2,424,976 | Golay et al. | Aug. 5, 1947 |
| 2,427,005 | King | Sept. 9, 1947 |
| 2,429,601 | Biskeborn et al. | Oct. 28, 1947 |

FOREIGN PATENTS

| Number | Country | Date |
|---|---|---|
| 702,686 | Germany | Feb. 13, 1941 |

OTHER REFERENCES

Fleming: "Principles of Electric Wave Telegraphy," 3rd edition, pages 413, 414, published 1916 by Longmans, Green and Co.